Dec. 21, 1965     G. J. SPROKEL     3,225,194

SCINTILLATION DETECTION APPARATUS

Filed April 30, 1962

INVENTOR.
GERARD J. SPROKEL

BY K. P. Johnson

ATTORNEY

United States Patent Office 3,225,194
Patented Dec. 21, 1965

3,225,194
SCINTILLATION DETECTION APPARATUS
Gerard J. Sprokel, Endicott, N.Y., assignor to International Business Machines Corporation, New York, N.Y., a corporation of New York
Filed Apr. 30, 1962, Ser. No. 191,062
17 Claims. (Cl. 250—71.5)

This invention relates generally to devices for measuring nuclear radiation, and more particularly to low level liquid scintillation counters.

Conventional scintillation counting systems for measuring nuclear radiation from radioactive substances basically comprise a scintillator to convert the energy of the nuclear particle or nuclear radiation into light, a photomultiplier tube to convert light into an electrical signal, a peak discrimination circuit for those signals, and a counter or scaler to indicate the rate of signal occurrence. Some counting systems employ a plurality of photomultiplier tubes connected in parallel to a coincidence network. This latter arrangement provides a more accurate count because spurious signals from a single tube are blocked by the coincidence network which can be activated only by coincident signals.

These known systems provide acceptable efficiency when used for detecting nuclear particles or nuclear radiation of relatively high energy. However, the detection efficiency is inadequate for soft beta and gamma emitters. In a liquid scintillator, the scintillations produced by the low energy emitters provide electrical signals that generally lie within the noise or thermionic emission region of photomultiplier tubes, and cannot be accurately identified or counted with conventional equipment. As a result, several attempts have been made to provide improved coincidence detection circuits for small signals within the background noise region of the tube.

Only moderate improvement has been achieved. These approaches have utilized a plurality of photomultiplier tubes connected in parallel to a coincidence circuit. When a highly sensitive circuit has been designed, its signal resolution time has been too long, which allows more time for chance coincidence of noise pulses and thus increases the background error. Alternatively, when a circuit with a short resolution time has been developed, signal sensitivity has been sacrificed so that only relatively strong scintillations are detected which decreases the detection efficiency. These circuits have failed to combine high sensitivity (for signals of 50 millivolts or less) with short resolution time (on the order of a few nanoseconds or millimicroseconds), which are necessary for accurate low level liquid scintillation counters.

Accordingly, it is an object of this invention to provide an improved low level liquid scintillation counting apparatus.

Another object of this invention is to provide a low level liquid scintillation counting apparatus suitable for assaying small quantities of soft beta and gamma emitting radioactive substances.

Another object of this invention is to provide low level liquid scintillation detection apparatus having improved detection sensitivity.

Another object of this invention is to provide low energy scintillation detection apparatus only negligibly affected by environmental radioactivity.

Another object of this invention is to provide a low level scintillation detection system controlled by anti-coincidence apparatus so as to be insensitive to background radiation to provide improved counting accuracy.

Yet another object of this invention is to provide a coincidence circuit employing negative resistance devices to achieve fast coincidence resolution.

Still another object of this invention is to provide a coincidence circuit capable of detecting scintillation signals within the noise regions of photomultiplier tubes.

A further object of this invention is to provide a novel time discrimination circuit employing negative resistance elements operated as monostable devices.

A still further object of this invention is to provide low level scintillation detection apparatus which is relatively simple and convenient to use.

In accordance with the foregoing objects, this invention provides primary and secondary pluralities of photo-responsive means with the individual photo-responsive means in each plurality sensing either a primary or secondary scintillator and producing varying electrical pulses representative of both noise and scintillations, which pulses are fed through transmission means to a quantizing or standardization circuit including a negative resistance device switchable from a first to a second current-conducting state while biased for monostable operation by biasing means. Each bias means has connected in series therewith an energy control means, effective to maintain the device in the second conducting state for a predetermined period of time when switched by either a noise or scintillating pulse. Each device in this manner produces from non-uniform input pulses, uniform output signals which are fed to differentiating and summing means, and the signal sum is applied as an input to coincidence means responsive only to a predetermined signal sum to produce a control signal. A coincidence means is provided for each plurality of photo-responsive means and is so connected to an anti-coincidence means that a count signal is produced when a coincidence signal from the primary plurality of photo-responsive means occurs in the absence of a coincidence signal from a secondary plurality. Count signals are supplied to a registering means to indicate the occurrence of scintillations in the primary scintillator.

The invention has the advantage of producing uniform output signals having fast rise times in response to noise or scintillation pulses even if these lie within the noise range of the photo-responsive means. Thus, there is enabled the production of extremely short differentiated signals so that, when the outputs of plural photo-responsive means are combined, the likelihood of coincident noise pulses is extremely remote. Also, the range of monostable operation of the negative resistance device is sufficiently wide to provide information as to the height distribution of the input pulses to permit isotopes to be distinguished. Furthermore, the need for heavy shielding to reduce background radiation is eliminated and in its place a shielding scintillator sensed by secondary photo-responsive means can be used to detect and cancel background radiation. Thus, since the chance coincidence of noise pulses can be nearly eliminated, soft beta and gamma emissions in the sample to be assayed are accurately detected. The elimination of heavy shielding also permits the use of larger primary detectors.

The foregoing and other objects, features and advantages of the invention will be apparent from the following more particular description of the preferred embodiments of the invention, as illustrated in the accompanying drawings.

Figure 1:
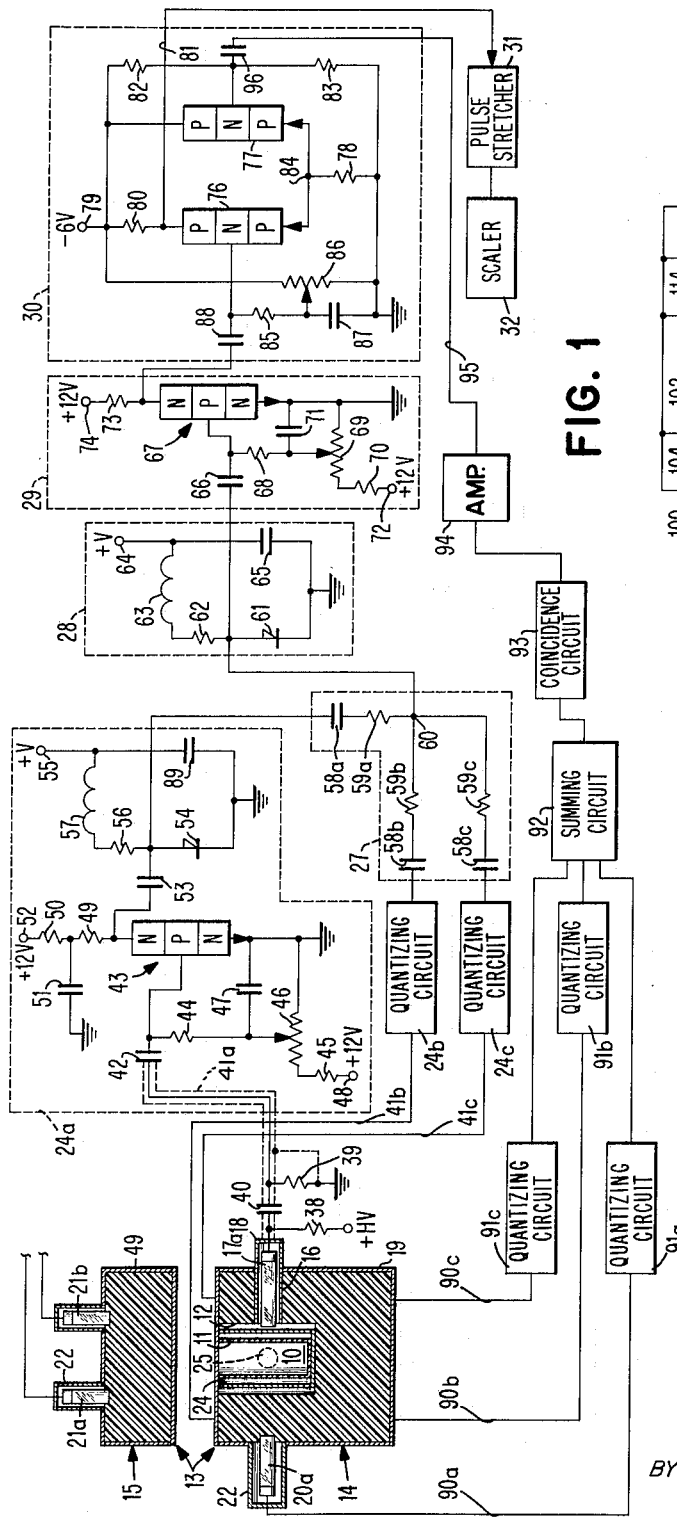
FIG. 1 is a combined sectional elevation view of the scintillation detection apparatus in conjunction with the electrical schematic diagram of the detection circuit of the invention.
Figure 2:
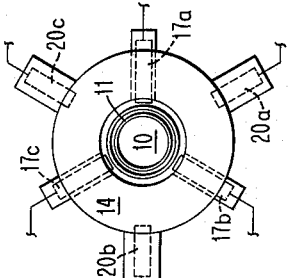
FIG. 2 is a schematic plan view of the primary scintillation detector and base position of the secondary scintillation detector used with the invention.

Referring to FIGS. 1 and 2, the primary detector 10 can be either a liquid, in which case it is contained in the transparent vessel 11, or it can be a solid. Liquid detectors are solutions of organic phosphors such as p-terphenyl or 2,5-diphenyl-oxazole with or without wave length shifters, for example, p-bis(2,5-phenyl oxazolyl)-1-benzene in aromatic solvents such as toluene or xylene. Solid detectors are solid solutions of p-terphenyl and p-p' diphenyl stilbene in polyvinyltoluene. All of these substances are commercially available and well-known in the art.

In the case of the liquid detector, the radioactive material is dissolved or suspended in the detector. With the solid detector, the radioactive material is in close proximity of the detector. In either case, the radioactive disintegration of the compound must produce scintillations in the detector.

Container 11 is set in a central recess 12 within a two-part shield or secondary detector generally designated as 13. For convenience of handling, the shield is preferably of solid scintillation material as described above. The two-part shield detector comprises a base portion 14 and a cover portion 15 that may be brought together to entirely shield primary detector 10 from background or atmospheric radiation.

Base 14, in addition to having recess 12, has formed therein a plurality of cavities 16, in each of which is located a photo-responsive electrical energy source 17a, 17b or 17c, such as a photomultiplier (PM) tube. Each cavity extends from the outer periphery of base 14 to recess 12 and permits each PM tube to be properly positioned to sense scintillations occurring within primary detector 10 and produce electrical pulses representative of these scintillations. The radial location of each of the tubes 17a-17c relative to detector 10 is more clearly illustrated in FIG. 2. Each of the tubes is isolated from stray light by opaque sheaths 18, which entirely surround each tube except at its light-sensitive face adjacent container 11. All of the tubes 17a-17c form a single tube plurality and respond simultaneously to each scintillation within primary detector 10.

Base and cover portions 14 and 15 of the secondary detector 13 are each completely enclosed by light-proof metallic sheaths 19 to eliminate interference between scintillations occurring within the primary and secondary scintillators 10 and 13 and outside light. As with the primary detector, base 14 and cover 15 are each equipped with their corresponding plurality of photo-responsive energy sources 20a, 20b, 20c and 21a, 21b, respectively, which also may be photomultiplier tubes. Tubes 20a-20c are appropriately disposed about the periphery of base portion 14 to sense scintillations therein, and comprise a separate tube plurality which produces simultaneous electrical pulses in response to each scintillation. Similarly, tubes 21a and 21b form another tube plurality and respond to scintillations within cover portion 15. The base and cover are each suitably formed to provide an efficient light transmission junction at the tube faces and opaque sheaths 22 envelope the exposed portions of the tubes to bar external light.

There is provided between container 11 and the walls of recess 12 a rotatable opaque cup-shaped member 24 having holes 25 in the cylindrical portion which correspond in location to the faces of tubes 17. When detector 10 is in place, member 24 is rotated sufficiently to expose the detector to the photomultiplier tubes. A suitable interlock (not shown) is provided so that before the detector can be removed member 24 must be rotated sufficiently to cover the exposed tube faces and protect them from excitation by external light.

As described thus far, it is seen that primary detector 10, and the base portion 14 and cover portion 15 of the secondary detectors 13 are each sensed by a separate plurality of photomultiplier tubes. When the radioactivity of the solution in the primary detector is being measured, some scintillations therein will be produced by atmospheric or background radiation which penetrates both the shield and primary detector. In such nuclear event it is likely that a scintillation will also be produced either in base 14 or cover 15 or both. The resulting signal from either base or cover is used to block the signal produced in the primary detector by the same event. This is achieved in an arrangement called an anti-coincidence circuit. However, scintillation pulses due to the radioactivity entirely within the primary detector are permitted to pass through the anti-coincidence circuit.

The tubes of each plurality are connected to similar scintillation detection circuits and only the circuit for tubes 17a-17c in the primary detector will be described in detail. These PM tubes are connected in the conventional, well-known manner to a source of high-voltage (not shown) and produce at their respective anodes output pulses which, at that point, represent either scintillations or random thermionic emissions known as noise. However, a scintillation occurring within the primary detector 10 will be sensed at the same time by each of the photomultiplier tubes, while the noise pulses produced independently in those tubes occur randomly and coincide only by chance. The individual anodes of tubes 17a-17c are each connected to respective quantizing circuits 24a, 24b or 24c which are, in turn, connected to differentiating and summing circuit 27. The summing circuit is connected to a coincidence circuit 28 whose output is supplied to amplifier 29. The output from amplifier 29 is then applied as one input to anti-coincidence circuit 30, which, in the absence of other inputs thereto, supplies a count signal to pulse stretcher 31 and scaler 32.

In FIG. 1, the anode impedance of PM tube 17a is the combination of resistors 38 and 39 closely matching the impedance of transmission line 41a. Capacitor 40 blocks the high voltage direct current and has negligible impedance at the frequencies involved. Pulses at the tube anode are supplied via the transmission line 41a to transistor 43 through capacitor 42 which blocks the D.C. bias on the transistor base. Base resistor 44 and the input impedance of the transistor match approximately the line impedance. Base forward bias is supplied by a decoupled network of resistor 45, potentiometer 46 and capacitor 47 connected between a positive potential at terminal 48 and ground. The emitter of the transistor is connected directly to ground and the collector is connected to a source of positive potential through the decoupled network of resistors 49, 50 and capacitor 51 at terminal 52. Transistor 43 is a high frequency device capable of amplifying pulses with a rise time of approximately 10 nanoseconds (ns.) with a width at half height of 20-40 ns. Although the circuit is shown using an NPN transistor, the type of device is immaterial.

Transistor 43 provides amplification of pulses on line 41a and supplies these pulses via capacitor 53 to a quantizing circuit which includes a negative resistance device such as tunnel diode 54 connected between ground and a source of positive potential at terminal 55 through resistor 56 and inductance 57. Capacitor 89 decouples the quantizing circuit. The transistor also serves to isolate the tunnel diode from line 41. Collector impedance of the transistor is the parallel combination of: collector resistor 49; the collector-base capacitance of the transistor; the tunnel diode 54; and the series arrangement of resistor 56 and inductance 57. Of these impedances, that of the tunnel diode is by far the lowest. The stray capacitance at this point must be kept to a minimum. The collector of the transistor is operated with a relatively high potential to minimize collector-base capacitance.

Figure 3:
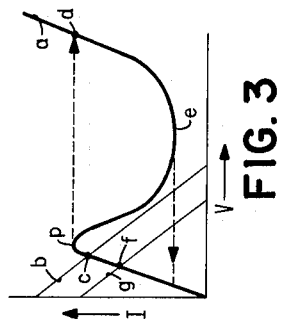
FIG. 3 is a current-voltage characteristic curve of semiconductor negative resistance devices used in the detection circuit.

The bias supplied at terminal 55 is determined by the switching sensitivity desired at the tunnel diode whose characteristic current-voltage curve is shown in FIG. 3. The tunnel diode circuit is sensitive to pulse leading edges and is used to generate output pulses of substantially uniform amplitude and duration in response to varying input pulses produced at the anode of PM tube 17a and amplified by transistor 43. Tunnel diode 54 is normally biased by the potential at terminal 55 to operate in a low voltage-high current conductive state. This is illustrated in FIG. 3 by the intersection c of load line b with characteristic curve a. Load line b is established to intersect curve a at only a single point so that the tunnel diode is biased for monstable operation. The D.C. bias at terminal 55 is adjusted (not shown) for the desired sensitivity. This enables the bias to be used as a linear discriminator which can be varied to obtain the integral pulse distribution of the input signals.

Under no signal conditions, the tunnel diode is set for conduction at some point below the switching voltage p, for instance at point c of FIG. 3. A signal of sufficient amplitude to raise the tunnel diode anode voltage beyond point p will trigger the circuit; smaller signals will not be accepted. The tunnel diode will switch temporarily to a high voltage-low current conductive state. As switching occurs, the tunnel diode becomes a generator driving the parallel network combination of: transistor load resistor 49 and its associated capacitance; the series arrangement of resistor 56 and inductance 57; and capacitor 58a and resistor 59a of differentiating and summing circuit 27 and tunnel diode coincidence circuit 28 in series therewith. This total load (principally resistors 49 and 56 and inductance 57) is such that the load line b intersects the I–V characteristic below point p. When switching occurs, the current through inductance 57 cannot change instantaneously, but relatively slowly so that the tunnel diode conductance moves downward on curve a from point d to point e where reset takes place. Thus, when the tunnel diode is repeatedly switched by pulses of sufficient amplitude, the device will produce output pulses of substantially uniform amplitude and duration.

The rise time of these output pulses will depend largely on the device used. With 5 ma. tunnel diodes, rise times of 1–2 ns. are obtained, with 20 ma. devices, rise times of 0.6–0.8 ns. are achieved. The duration or width of these pulses is determined mainly by the size of inductance 57; the width increases as the inductance increases. For example, with 5 ma. devices and an inductance of 0.2 μh. the width is 10 ns. which will increase to 25 ns. when the inductance is 1 μh. Pulse height is on the order of 200 mv., increasing slightly with increasing inductance. Pulses of shorter duration can be obtained by using 20 ma. tunnel diodes and omitting the inductance 57 altogether. However, with the presently available photomultiplier tubes, there is no advantage in shortening pulses further.

Resistor 59a in series with the coincidence tunnel diode 61 attenuates the input signal appearing at the anode of that device. Capacitor 58a is chosen such that pulses much wider than 2 ns. are differentiated. Thus, if a series inductance is used in conjunction with tunnel diode 52 to produce a signal 10 ns. wide, the attenuated signal at the coincidence tunnel diode 61 will be approximately 2 ns. wide with an amplitude of about one tenth that at tunnel diode 52.

Tunnel diode 61 is the switching device of coincidence circuit 28 which also includes anode resistor 62 and inductance 63 connected to a source of positive potential at terminal 64. Capacitor 65 serves as a decoupling capacitor. The cathode of device 61 is connected to ground. The action of this circuit is similar to that described for tunnel diode 54, viz., the tunnel diode 61 is biased for monstable operation on its characteristic I–V curve such as at point f on a load line g and will trigger upon receipt of a signal sufficient to drive the diode above point p. However, the triggering signal, in this instance, is required to be the sum of coincident signals from all PM tubes 17a, 17b and 17c.

Each of the PM tubes 17b and 17c is also connected to an amplifying and quantizing circuit 24b or 24c identical to that so far described for tube 17a and each circuit will produce similar pulses at the anode of tunnel diode 61. The trigger pulses appearing at the anode of device 61 are the algebraic sum of any overlapping pulses from the quantizing circuits. Thus, the bias of tunnel diode 61 may be chosen so that the diode will be triggered by the degree of pulse overlap desired. For example, it may be such that the peak voltages of three pulses coincide before triggering occurs, and in that instance the three photomultiplier cathodes must respond simultaneously to produce an output from the coincidence circuit. Alternatively, the bias may be selected so that only two coincident pulses produce a sufficient trigger or that three pulses spaced in time by one or two ns. can produce the necessary trigger. Clearly the D.C. bias on tunnel diode 61 determines the coincidence time or pulse overlap necessary to produce an output therefrom once the shape of the pulses from the quantizing circuits is chosen. With 5 milliamp (ma.) diodes a coincidence time of 2–4 ns. can be obtained, and with 20 ma. diodes a coincidence time of one ns. is possible.

The importance of differentiating and summing network 27 may be illustrated by considering the following case. Assume that PM tube 17a produces a noise pulse which triggers tunnel diode 54, and that PM tubes 17b and 17c do not produce outputs at this time. The pulse from tunnel diode 54 appears at junction 60 and is fed back to the corresponding tunnel diodes in circuit 24b and 24c. Because of the low impedance of these tunnel diodes, the feedback signal is approximately 0.01 of the output signal from diode 52 which is too small to trigger these devices. However, if such attenuations were not provided, nearly every signal generated by diode 54 would trigger the corresponding tunnel diodes in networks 24b and 24c so that the circuit would operate in an "OR" fashion rather than in the desired "AND" mode.

The action of the coincidence circuit 28 can be summarized thusly. A weak light flash generated in primary detector 10 by a nuclear event will product one pulse at each of the three PM tube anodes. The three pulses occur simultaneously for the time under consideration. If these pulses are each of sufficient magnitude to trigger their respective tunnel diodes, a trigger pulse of sufficient amplitude will appear to switch tunnel diode 61 and provide a coincidence signal therefrom. Since the bias of tunnel diode 54 and its corresponding diodes may be adjusted to select the amplitude of PM pulses necessary for triggering, there can be determined the integral pulse distribution and the energy spectrum of the nuclear disintegration. Noise pulses generated at the individual photocathodes will trigger their associated tunnel diodes, but since noise pulses do not generally occur simultaneously, no output signal will be produced from coincidence tunnel diode 61. Noise count rates are usually on the order of 10,000 pulses per second, but the noise count rate at the coincidence circuit is far less than one pulse per hour. This large reduction is made possible by the use of coincidence times on the order of a few nanoseconds.

The circuitry associated with shield detectors 14 and 15 is the same as that described above for the primary detector 10, and is, therefore, not shown in detail. However, the coincidence circuit for shield detector 14 is shown schematically. Each of the PM tubes 20a, 20b and 20c supply noise or scintillation pulses over lines 90a, 90b and 90c to respective quantizing circuits 91a, 91b and 91c. The output signals from these circuits are supplied through differentiating and summing network 92 to coincidence circuit 93. When a coincidence signal is generated, it is amplified by amplifier 94 and supplied on line 95 as an input signal across capacitor 96 to an anti-coincidence circuit 30. A similar coincidence arrangement is provided for tubes 21a and 21b of shield detector portion 15. Obviously, only two quantizing circuits are necessary and coincidence signals are produced when only two overlapping output signals are supplied to a coincidence circuit. The amplified coincidence signals are also supplied as another input to anti-coincidence circuit 30. Photomultiplier noise in the shield portions 14 and 15 is again reduced by the triple and the dual coincidence arrangement associated respectively therewith. Usually the coincidence tunnel diode bias is such that complete pulse overlap is not necessary to produce a coincidence output. A pulse spread of approximately 2 ns. is still accepted which allows for the time lost in multiple refraction in the detectors. The coincidence pulses produced from detectors 14 and 15 are used to veto or block certain pulses from detector 10 through the operation of the anti-coincidence circuit 30.

The anti-coincidence circuit proper is comprised of transistor pair 76 and 77 and operates to provide an output count signal in accordance with the coincidence signals received from coincidence tunnel diode 61 and the corresponding coincidence tunnel diodes for shield detectors 14 and 15. The coincidence signals must first be amplified, however, before they can be applied to the anti-coincidence pair. Amplification of the coincidence signal is accomplished by transistor 67 in amplifier 29 connected in the conventional grounded emitter configuration, providing a gain of about 5. Capacitor 66 and resistor 68 form the input network. Potentiometer 69 and resistor 70, decoupled by capacitor 71, determine the base bias and are connected to a source of positive potential at terminal 72. The collector is connected through resistor 73 to a source of positive potential at terminal 74 and a negative output signal of approximately 1 volt is obtained at the collector in response to an input coincidence signal. Although an NPN transistor is shown this type of device is not essential.

Returning now to the anti-coincidence transistor pair, transistors 76 and 77 are connected in parallel through a common emitter resistor 78 to ground. Their collectors are both tied to a source of negative potential at terminal 79, except that a resistor 80 is included in the collector circuit of transistor 76. A count signal is taken from the collector on line 81. Transistor 77 is an emitter follower with its base biased through resistors 82 and 83, determining the potential at the common emitter junction 84 at approximately −2.6 volts. The base bias circuit for transistor 76 includes resistor 85 and potentiometer 86, decoupled by capacitor 87, which is set by the potentiometer to maintain the base at approximately −2.8 volts. The negative pulse from amplifier 29 appears across capacitor 88 driving transistor 76 into conduction and producing a positive count signal of about 2 volts on line 81 if there is no input signal at the base of transistor 77. However, if the coincidence circuits and subsequent amplifiers of either or both shield detectors produce an output signal, a −1 volt signal will appear at the base of transistor 77 decreasing common emitter voltage at junction 84 to approximately −3.6 volts. Transistor 76 is now cut off sufficiently so that a signal at its base will not produce a useful count signal at its collector on line 81. Thus, the anti-coincidence circuit produces a count signal only if a trigger pulse arrives from detector 10 in the absence of coincidence signals from shield detectors 14 or 15. Finally, the count signal on line 81 is stretched sufficiently in a conventional monostable multivibrator circuit 31 to actuate any suitable scaler 32. This arrangement is well known and need not be described in detail. Although the anti-coincidence circuit is slower than the coincidence circuits (producing a pulse of about 50 ns. width), it is sufficient for the count rates involved.

The purpose of the anti-coincidence circuit may be illustrated by considering the following. In assaying weak radioactive signals in detector 10, pulses originating in this detector, but not caused by the radioactive sample therein, may contribute substantially to the observed count rate. While this extraneous "background" can be determined separately and applied as a correction factor to the observed count rate, for weak samples the correction may be of the same order as the corrected count rate. Thus, the relative standard deviation of the true sample count rate will increase sharply as the true ratio decreases. It is more accurate to determine for each pulse from detector 10 whether it is a true sample pulse and reject it, if it is not.

The anti-coincidence arrangement accomplishes this selection for certain kinds of background pulses. Consider the case where a signal is generated in detector 10 by gamma radiation from a source outside the instrument. It is likely that the same gamma ray will also interact somewhere in the shield detector 14 or 15. Thus, the shield detector responds at the same time and cancels the signal from the primary detector 10. It will be clear that the anti-coincidence arrangement cannot distinguish between true sample pulses and pulses arising from radioactive contamination within detector 10. Such pulses will still contribute to the background.

Figure 4:
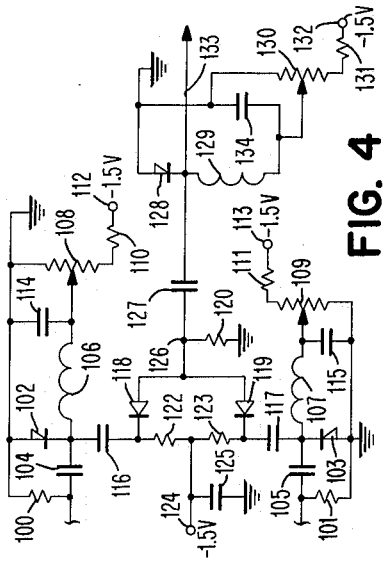
FIG. 4 is an alternative embodiment of a time discrimination circuit that may be used in the detection circuit of FIG. 1.

An alternative time discrimination circuit is shown in FIG. 4. This circuit is illustrated for dual coincidence and performs the same function as the quantizing circuits, the differentiating and summing circuit and coincidence circuit of FIG. 1. Major differences are that the quantizing tunnel diodes are connected in parallel to the PM tube anode load resistors, and forward-biased diodes are used in the differentiating circuit to block feedback from one quantizing circuit to the other. While the diodes prevent crosstalk, they also slow the circuit down so that a resolving time of about 5 ns. is obtained.

In FIG. 4, resistors 100 and 101 form two PM tube load impedances. Since the input pulses are negative, the anodes of tunnel diodes 102 and 103 are grounded. The pulses are supplied across capacitors 104 and 105. Inductances 106 and 107 form the respective tunnel diode loads and each tunnel diode is biased through respective networks of potentiometers 108, 109 and resistors 110, 111 connected to sources of negative potential at terminals 112, 113. Capacitors 14 and 115 decouple the bias voltages. The bias network maintains the quiescent operating point of the tunnel diodes below point $p$ of FIG. 3 as described above. The differentiating and summing network includes capacitors 116 and 117, diodes 118 and 119, and resistor 120. Diodes 118 and 119 are each forward biased through respective resistors 122 and 123 connected to a source of negative potential at terminal 124 and are decoupled by capacitor 125. This bias is adjusted by a potentiometer (not shown) for minimum signal attenuation in the forward direction but maximum attenuation in the reverse direction. Thus crosstalk between the input signals from tunnel diodes 102 and 103 is eliminated. Since the signals are small the diodes are not driven to saturation and therefore slow the rise time appreciably.

Input pulses from the PM tubes will appear at their respective load impedances 100 or 101 and will, when of sufficient amplitude, cause tunnel diodes 102 or 103 to switch from the quiescent condition to point $d$ of FIG. 3. The signal produced by the switching action of either tunnel diode is differentiated by capacitors 116 or 117 and will produce an attenuated pulse at junction 126 across resistor 120. Inductances 106 and 107 are chosen to be relatively large if the time constant of the differentiating circuit is small so that only the leading edge of the tunnel diode pulse will pass. The rise time of the pulses at resistor 120 is longer in this embodiment, so that the time resolution obtained with this circuit is less than that of FIG. 1. However, a resolution time of 5 ns. is still possible. As described for the first embodiment, two pulses from the two PM tubes will add algebraically at junction 126 when they overlap in time. The summed signal appears across capacitor 127 at the cathode of tunnel diode 128.

Coincidence tunnel diode 128 is similarly biased by inductance 129, potentiometer 130, and resistor 131 connected at terminal 132 to a negative potential, so that it will respond to the desired amplitude of summed pulses at junction 126. The bias may be adjusted so that the tunnel diode responds to completely overlapping pulses at junction 126, or be relaxed somewhat to be triggered by pulses that overlap to a lesser extent. Tunnel diode 128 and the associated circuitry are comparable to tunnel diode 61 and its associated circuitry of FIG. 1. The output from diode 128 is taken on line 133 and may be supplied to an amplifier. Capacitor 134 serves as a decoupling capacitor for the coincidence bias network. Although the circuit of FIG. 4 has been described for use with two PM tubes, it is obvious that modifications may be made therein to adapt the circuit for use with additional tubes.

Exemplary components and component values for both embodiments may be as follows:

| Component | Value |
|---|---|
| PM tubes 17a–17c, 20a–20c and 21a–21b | Type 9514S. |
| Resistor 38 | 1000 ohms. |
| Resistor 39 | 110 ohms. |
| Resistors 44, 49, 50 | 120 ohms. |
| Resistor 45 | 560 ohms. |
| Resistors 56, 62 | 68 ohms. |
| Resistors 59a–59c | 100 ohms. |
| Resistors 68, 73 | 470 ohms. |
| Resistor 70 | 10,000 ohms. |
| Resistor 78 | 390 ohms. |
| Resistor 80 | 270 ohms. |
| Resistor 82 | 2200 ohms. |
| Resistor 83 | 2000 ohms. |
| Resistor 85 | 1000 ohms. |
| Resistors 100, 101, 120 | 50 ohms. |
| Resistors 110, 111, 131 | 100 ohms. |
| Resistors 122, 123 | 330 ohms. |
| Potentiometer 46 | 100 ohms. |
| Potentiometer 69 | 1000 ohms. |
| Potentiometer 86 | 10,000 ohms. |
| Potentiometers 108, 109, 130 | 50 ohms. |
| Capacitor 40 | 2000 picofarad 3 kv. |
| Capacitors 42, 88, 96, 104, 105 | 100 picofarad. |
| Capacitors 47, 51, 65, 71, 87, 89, 114, 115, 125, 127 | 0.01 microfarad. |
| Capacitor 53 | 200 picofarad. |
| Capacitors 58a–58c | 20 picofarad. |
| Capacitor 66 | 470 picofarad. |
| Capacitors 116, 117 | 22 picofarad. |
| Transistors 43, 67 | P.S.I. 2N921. |
| Transistors 76, 77 | G.E. 2N994. |
| Tunnel diodes 54, 61, 102, 103, 128 | R.C.A. 1N3128. |
| Diodes 114, 115 | Hughes HPA 2800. |
| Inductance 57 | 0.1 microhenry. |
| Inductance 63 | 0.2 microhenry. |
| Inductances 106, 107, 129 | 150 microhenry. |

While the invention has been particularly shown and described with reference to preferred embodiments thereof, it will be understood by those skilled in the art that various changes in form and details may be made therein without departing from the spirit and scope of the invention.

What is claimed is:

1. In scintillation detection apparatus employing multiple pluralities of electrical energy sources in which each said source independently produces electrical pulses of varying width and amplitude, a discrimination circuit comprising, in combination:
   a circuit means for each said source responsive to said varying pulses for providing substantially uniform electrical output signals;
   means for each said plurality of said sources connected to each said circuit means of a plurality for differentiating and summing said electrical signals from its respective plurality;
   a coincidence means connected to each said differentiating and summing means responsive to a predetermined signal sum of said differentiated signals for producing a coincidence signal;
   anti-coincidence means associated with each said coincidence means for generating a count signal when a coincidence signal from a selected one of said coincidence means occurs in the absence of a coincidence signal from other said coincidence means; and
   means for utilizing said count signals.

2. The circuit as described in claim 1 wherein each said circuit means and each said coincidence means includes a negative resistance device adapted to be switched from a first conductive state to a second conductive state by said pulses and said voltage sums, respectively.

3. In nuclear scintillation detection apparatus having a primary scintillator and a shield scintillator therefor, scintillation counting apparatus, comprising, in combination:
   a plurality of first photo-responsive means for sensing said primary scintillator, each producing varying, random electrical output pulses;
   a plurality of second photo-responsive means for sensing said shield scintillator, each producing varying, random electrical shield pulses;
   a plurality of first circuit means, each connected to one of said first photo-responsive means for producing a first output signal of standard amplitude and duration in response to each said output pulse;
   a plurality of second circuit means, each connected to one of said second photo-responsive means for producing a second output signal of standard amplitude and duration in response to each said shield pulse;
   first combination means connected to each said first circuit means for differentiating and summing said first output signals;
   second combination means connected to each said second means for differentiating and summing said second output signals;
   first coincidence means operably coupled to said first combination means and responsive to a predetermined sum of said differentiated first output signals for producing a first control signal;
   second coincidence means operably coupled to said second combination means and responsive to a predetermined sum of said differentiated second output signals for producing a second control signal;
   anti-coincidence means responsive to both said first and second control signals for providing a count signal only when said first control signal occurs in the absence of said second control signal; and
   means connected to said anti-coincidence means for registering said count signals.

4. Apparatus as described in claim 3 wherein each said first circuit means includes a negative resistance device adapted to be switched from a first conductive state to a second conductive state by each said output pulse to provide a said first output signal.

5. Apparatus as described in claim 4 wherein said first circuit means further includes a bias means connected to each said negative resistance device for biasing said device in said first conducting state.

6. In scintillation detection apparatus employing a plurality of independent electrical energy sources, each producing random electrical output pulses of varying width and amplitude, a discrimination circuit comprising, in combination:
   a circuit means corresponding to each said source and responsive to said varying pulses from said source for providing substantially uniform electrical output signals, each said circuit means including switchable means responsive to said pulses for providing output signals each having a rise time of less than three millimicroseconds;

means connected to each said circuit means for summing said output signals;

means responsive to a predetermined signal sum for producing a control signal; and means for utilizing said control signal.

7. The circuit as described in claim 6 wherein said switchable means comprises a tunnel diode.

8. In scintillation detection apparatus employing a plurality of independent electrical energy sources, each producing electrical output pulses of varying width and amplitude, a time discrimination circuit comprising, in combination:

circuit means corresponding to each said source and responsive to said varying pulses from said source for providing substantially uniform electrical output signals, each said circuit means including a negative resistance switching device and inductance element for controlling said device;

means connected to each said circuit means for differentiating and summing said output signals;

means responsive to a predetermined signal sum for producing a control signal; and means for utilizing said control signal.

9. The circuit as described in claim 8 wherein said negative resistance switching device comprises a tunnel diode.

10. In nuclear scintillation apparatus having a scintillator, a detection circuit comprising, in combination:

a plurality of photo-responsive means for sensing said scintillator and producing random, varying, electrical output pulses;

a plurality of standardization means each coupled to one of said photo-responsive means for converting said output pulses into output signals having uniform amplitude and duration;

means connected to each said standardization means for differentiating and summing said output signals and providing an instantaneous sum thereof;

means coupled to said differentiating and summing means for producing a detection signal in response to a predetermined output signal sum; and means for utilizing said detection signal.

11. The circuit as described in claim 10 wherein said standardization means includes switchable means for producing said uniform output signals, each having a rise time of less than three millimicroseconds.

12. In scintillation detection apparatus employing a plurality of electrical energy sources, each providing electrical pulses of varying width and amplitude, a time discrimination circuit comprising, in combination:

a plurality of negative resistance devices each corresponding to one of said sources and capable of being switched by an input pulse from a first conducting state to a second conducting state to provide an output signal;

means for biasing each said device for stable conductance in only said first state;

an input means connected to each said device and adapted to transmit said varying pulses from a said corresponding source for switching said device from said first state to said second state and produce said output signals;

control means connected in series with each said bias means and its said device for maintaining said device in said second state for a predetermined time interval when said device is switched from said first to said second state;

means connected to each of said devices for differentiating and summing said output signals, and coincidence means connected to each said summing means for providing a coincidence signal only when the sum of said differentiated output signals reaches a predetermined amplitude.

13. A circuit as described in claim 12 wherein said coincidence means includes a negative resistance switching device having first and second conducting states; and bias means for biasing said last mentioned device for stable operation in said first conducting state.

14. Counting apparatus for a low level liquid scintillation detector comprising, in combination:

a plurality of photo-responsive means each sensing said detector for nuclear scintillations and producing varying voltage pulses indicative of said scintillations;

a plurality of negative resistance devices each corresponding to one of said photo-responsive means and adapted to be switched by input pulses from one conductive state to another and produce substantially uniform output signals;

means connected to each said device for biasing said device for monostable operation in said one state;

means for transmitting said varying voltage pulses from each of said photo-responsive means to its said corresponding device as input pulses to switch said device to said one to said other state;

means connected in series with each said bias means and said device for maintaining said devices in other states for a predetermined time when switched;

means for differentiating and summing said output signals;

means connected to said summing means for producing a control signal when the sum of said differentiated signals reaches a predetermined amplitude; and means for utilizing said control signal.

15. In scintillation detection apparatus employing a plurality of independent electrical energy sources with each said source having connected thereto a load impedance providing electrical output pulses, a time discrimination circuit comprising, in combination:

a negative resistance switching device for each said source having first and second conductive states and connected in parallel with a said impedance and adapted to be switched from said first to said second state by said pulses to produce output signals;

means for biasing each said device for monostable operation in said first conductive state;

control means connected in series with each said bias means and said device for maintaining said device in said second state for a predetermined time after said device is switched to said second state;

means connected to each of said devices for differentiating and summing said output signal;

means responsive to a predetermined signal sum at said differentiating and summing means for producing a control signal; and means for utilizing said control signal.

16. This circuit as described in claim 15 wherein said control signal means includes a negative resistance switching device biased for monostable operation.

17. In scintillation detection apparatus employing a plurality of independent electrical energy sources with each source having connected thereto a load impedance to provide electrical output pulses, a time discrimination circuit comprising, in combination:

a negative resistance switching device for each said source having first and second conductive states and connected in parallel with said impedance adapted to be switched from said first to said second state by said pulses to produce output signals;

means for biasing each said device for monostable operation in said first conductive state;

control means connected in series with each said bias means and said device for maintaining said device in said second state for a predetermined time after said device is switched;

multiple input means having each said input connected to one of said devices for differentiating and summing said output signals;

means for electrically isolating each said input from every other input;

means responsive to a predetermined signal sum at said multiple input means for producing a control signal; and means for utilizing said control signal.

References Cited by the Examiner

UNITED STATES PATENTS

| | | | |
|---|---|---|---|
| 2,881,324 | 4/1959 | Scherbatskoy | 250—71.5 |
| 3,041,454 | 6/1962 | Jones et al. | 250—71.5 |
| 3,071,689 | 1/1963 | Scherbatskoy | 250—71.5 X |

RALPH G. NILSON, *Primary Examiner.*

ARCHIE R. BORCHELT, *Examiner.*